Oct. 4, 1960 R. W. SONNENFELDT ET AL 2,955,153

MAGNETIC COLOR DEMODULATOR SYSTEM

Filed Dec. 20, 1956 5 Sheets-Sheet 1

INVENTORS
RICHARD W. SONNENFELDT
GUSTAVE L. GRUNDMANN &
CARMEN LOUIS CUCCIA
BY
ATTORNEY

INVENTORS
RICHARD W. SONNENFELDT
GUSTAVE L. GRUNDMANN &
CARMEN LOUIS CUCCIA
BY
ATTORNEY

MAGNETIC COLOR DEMODULATOR SYSTEM

Filed Dec. 20, 1956 5 Sheets-Sheet 3

INVENTORS
RICHARD W. SONNENFELDT
GUSTAVE L. GRUNDMANN &
CARMEN LOUIS CUCCIA
BY
[signature]
ATTORNEY INVENTORS
RICHARD W. SONNENFELDT
GUSTAVE L. GRUNDMANN &
CARMEN LOUIS CUCCIA
BY
Olin J. Mitchell
ATTORNEY INVENTORS
RICHARD W. SONNENFELDT
GUSTAVE L. GRUNDMANN &
CARMEN LOUIS CUCCIA
BY
[signature]
ATTORNEY

United States Patent Office 2,955,153
Patented Oct. 4, 1960

2,955,153

MAGNETIC COLOR DEMODULATOR SYSTEM

Richard W. Sonnenfeldt, Haddonfield, Gustave L. Grundmann, Westmont, and Carmen L. Cuccia, Princeton, N.J., assignors to Radio Corporation of America, a corporation of Delaware Filed Dec. 20, 1956, Ser. No. 629,750
17 Claims. (Cl. 178—5.4)

Figures 1, 2:
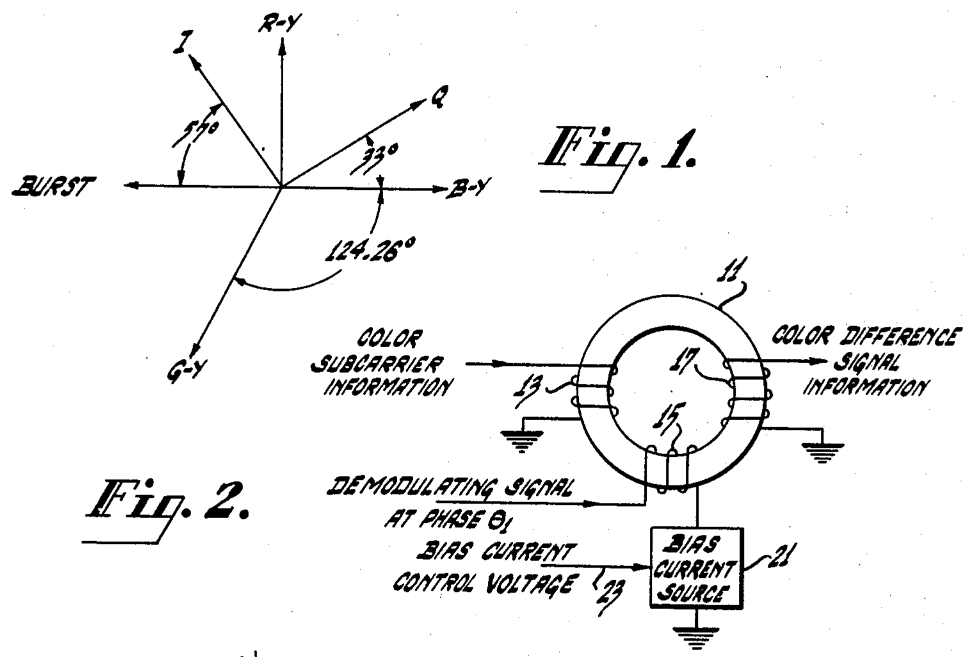

The present invention relates to improved automatic chroma control circuits and more particularly to automatic chroma control circuits and color killer circuits which are used in color television receivers employing non-linear magnetic demodulators for demodulating information from a chrominance signal.

The present color television signal includes a luminance signal which represents brightness information and also a chrominance signal. The chrominance signal is a modulated subcarrier whose sidebands represent a wide gamut of color difference signal information. Modulations representative of different color difference signals are included at various phases of the chrominance signal with the amplitude of the chrominance signal at each phase being indicative of the saturation of the color difference signal information occurring at that phase.

The color difference signals represent information describing how each component color in a televised scene differs from the corresponding color content in the luminance information representing that televised scene. The luminance signal is formed with proportions of red, green, and blue component color information according to the ratio .30:.59:.11. Red, green, and blue color difference signals, that is, R—Y, G—Y, and B—Y signals when individually added to the luminance or Y signal provide the component color signals R (red), G (green), B (blue) which describe the televised scene.

One or more color difference signals may be demodulated from the chroma signal by synchronous demodulation, that is, by mixing the chrominance signal with each of a corresponding plurality of demdulating signals having the frequency of the chrominance signal, with each demodulating signal having a prescribed phase of the chrominance signal corresponding to that phase in the chrominance signal at which desired color difference signal information occurs.

In any color television receiver circuit located at a point remote from a broadcast transmitter, it is necessary that demodulating signals, be generated which have accurately maintained phase with respect to the phases of the chrominance signal. In order to make the generation of such accurately phased demodulating signals possible, bursts of reference phase information having the frequency of the chrominance signal are transmitted on the "back-porch" of the horizontal synchronizing pulse which occurs during each retrace interval. These bursts provide an additional function; the presence of the color synchronizing bursts in a received color television signal is indicative of the fact that a color television signal is being received. If no color synchronizing bursts are present, the received television signal is representative of a monochrome image. Also the signal strength of the synchronizing bursts yields an excellent indication of the signal strength of the chrominance signal portion of the color television signal.

If the signal strength of the chrominance signal fluctuates, this fluctuation of signal strength may cause objectionable color changes in the image reproduced by a color reproducer. For optimum operation of a color television receiver, it is therefore desirable to employ a circuit known as an automatic chroma control circuit which maintains the amplitude level of demodulating color difference signal information independent of fluctuations in the signal strength of the chrominance signal in an incoming television signal. Also, it is further desirable that color killer action be produced; that is, when the transmission is of video information representing only a monochrome image, the high frequency information in the video information must be prevented from developing spurious information in the chrominance channel of the color television receiver. Information relating to the presence or absence of color synchronizing bursts, and the signal strength of the bursts when present, is used to control automatic chroma control and color circuits, respectively; i.e. the signal strength of the color synchronizing bursts is used to control an automatic chroma control circuit, and a circuit which is responsive to the presence or the absence of the bursts will render a portion of the chrominance signal channel inoperative when the bursts are not present.

It is therefore an object of the present invention to provide simplified automatic chroma control and color killer circuits for use in a color television receiver.

It is a further object of the invention to provide an improved and simplified means for controlling the amplitude level of demodulated color difference signal information in a color television receiver as a function of the signal strength of received color synchronizing bursts.

It is another object of the invention to provide an improved means for disabling the color demodulators of a color television receiver when the color synchronizing bursts are absent in a received television signal.

In the practice of the invention, a non-linear magnetic device consisting of a magnetic core having a plurality of windings, is used as a color demodulator. A color information signal related to the chrominance signal and also the demodulating signal are applied to an input winding and a demodulating signal winding, respectively, of the non-linear magnetic demodulator. A non-linear relationship exists between current through the windings and the flux through the high-$\mu$ iron core; the flux produced in the iron core will therefore have a varying component which is representative of demodulated color information. This demodulated color information will be developed in differentiated form in an output winding of the non-linear magnetic device.

If the color information signal applied to the input winding is an integrated chrominance signal, the differentiated demodulated color information will be the color difference signal occurring in the chrominance signal at the phase of the demodulating signal. If a chrominance signal is applied directly to the input winding, an integrating circuit coupled to the output winding will develop the color difference signal occurring in the chrominance signal at the phase of the demodulating signal.

According to the invention, automatic chroma control is achieved in the color demodulator described above by changing the average level of the current through a winding, such as the demodulating signal winding, to different points on a non-linear curve relating the current through the windings to the flux through the high-$\mu$ iron core where different slopes of the curve exist, in accordance with the signal strength of a received chrominance signal. The amplitude level of the demodulated color difference signal information is therefore caused to be relatively independent of fluctuations in the signal strength of the received chrominance signal. During color killer action, the non-linear magnetic demodulator is provided with a current which adjusts the flux of the iron core to a region where no change in flux responsive to a change in current occurs when no color synchronizing bursts are present in a received television signal.

Figure 3:
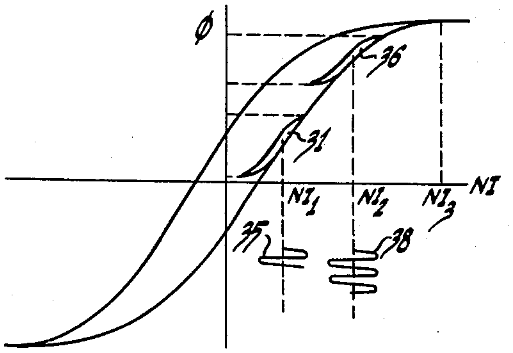
Figure 4:
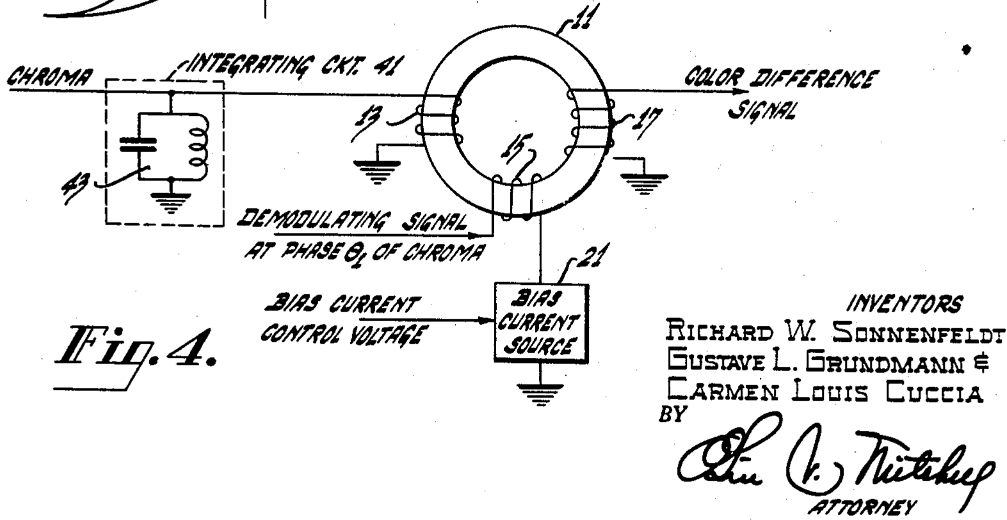
Figure 5:
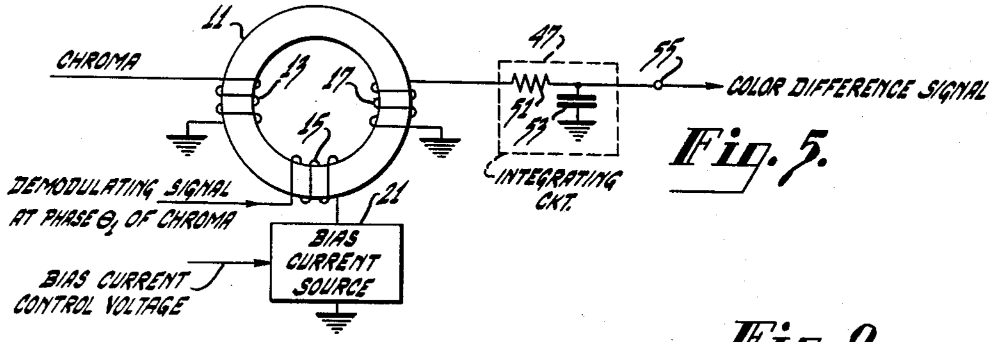
Figure 9:
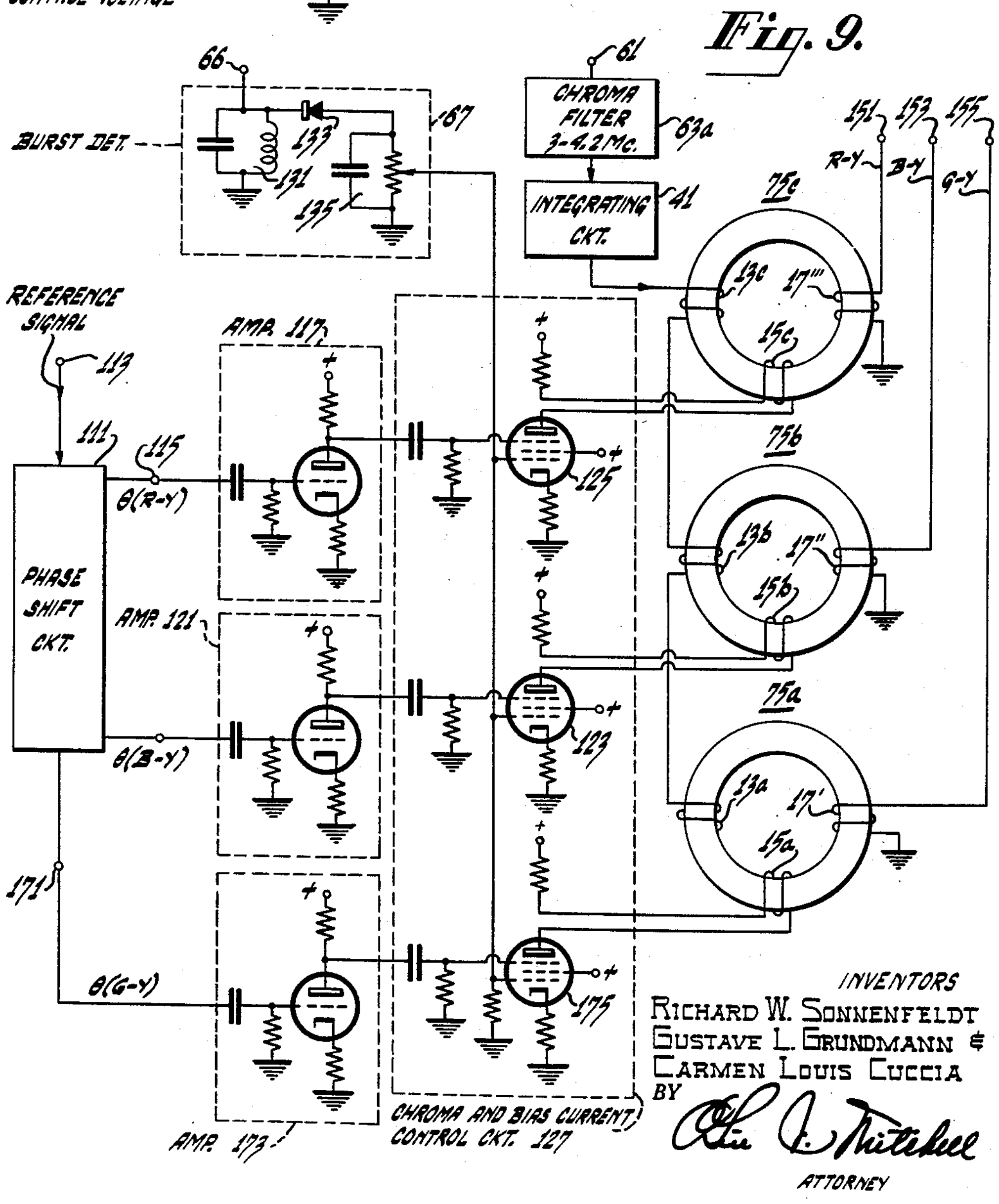
Figure 6:
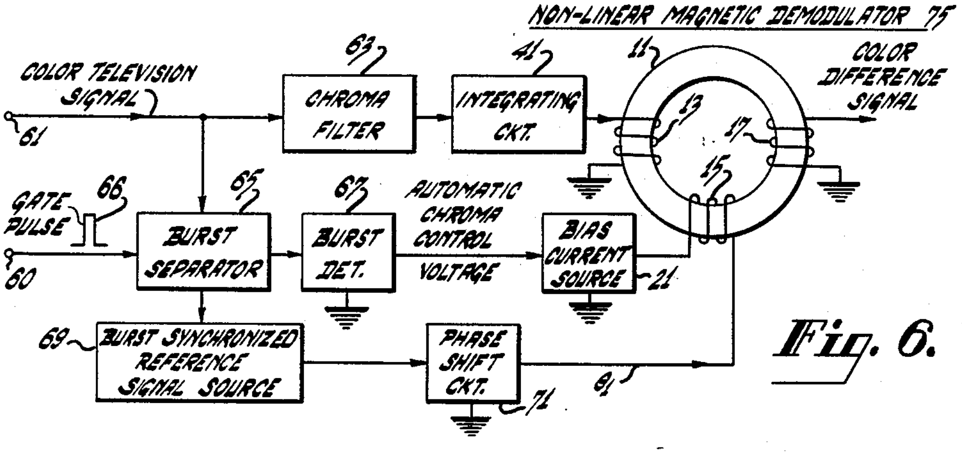
Figure 8:
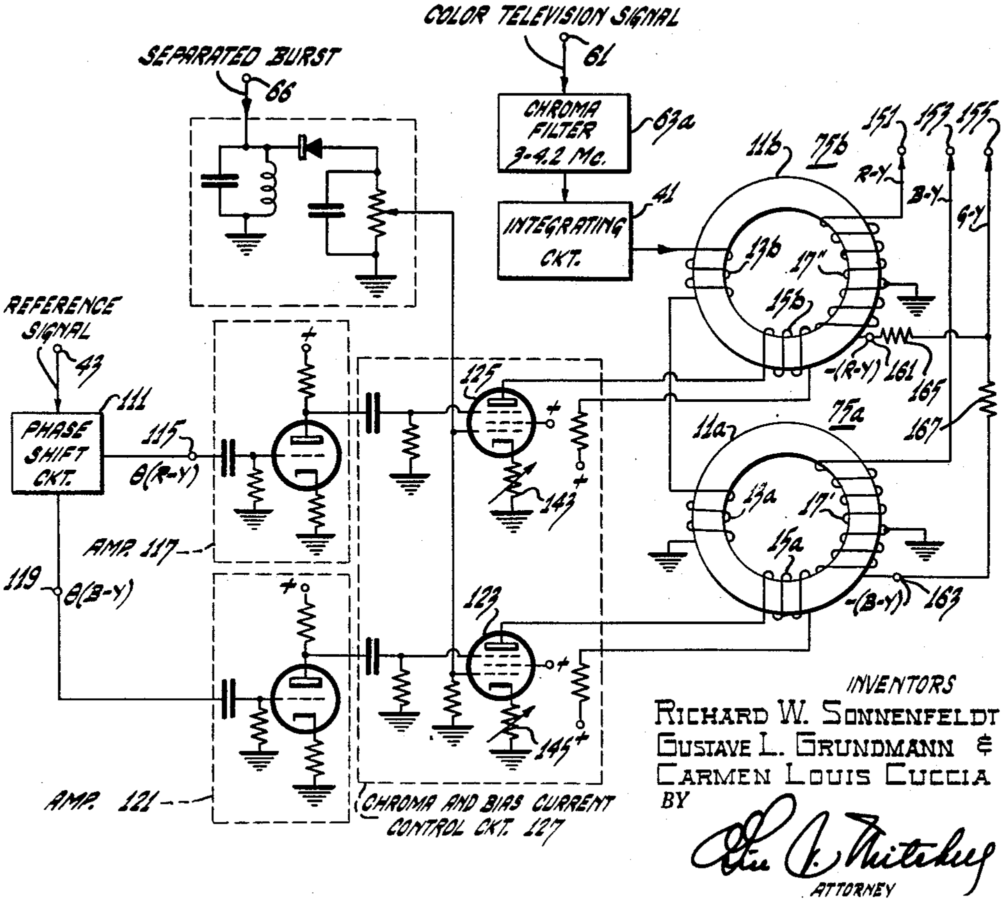
Figure 7:
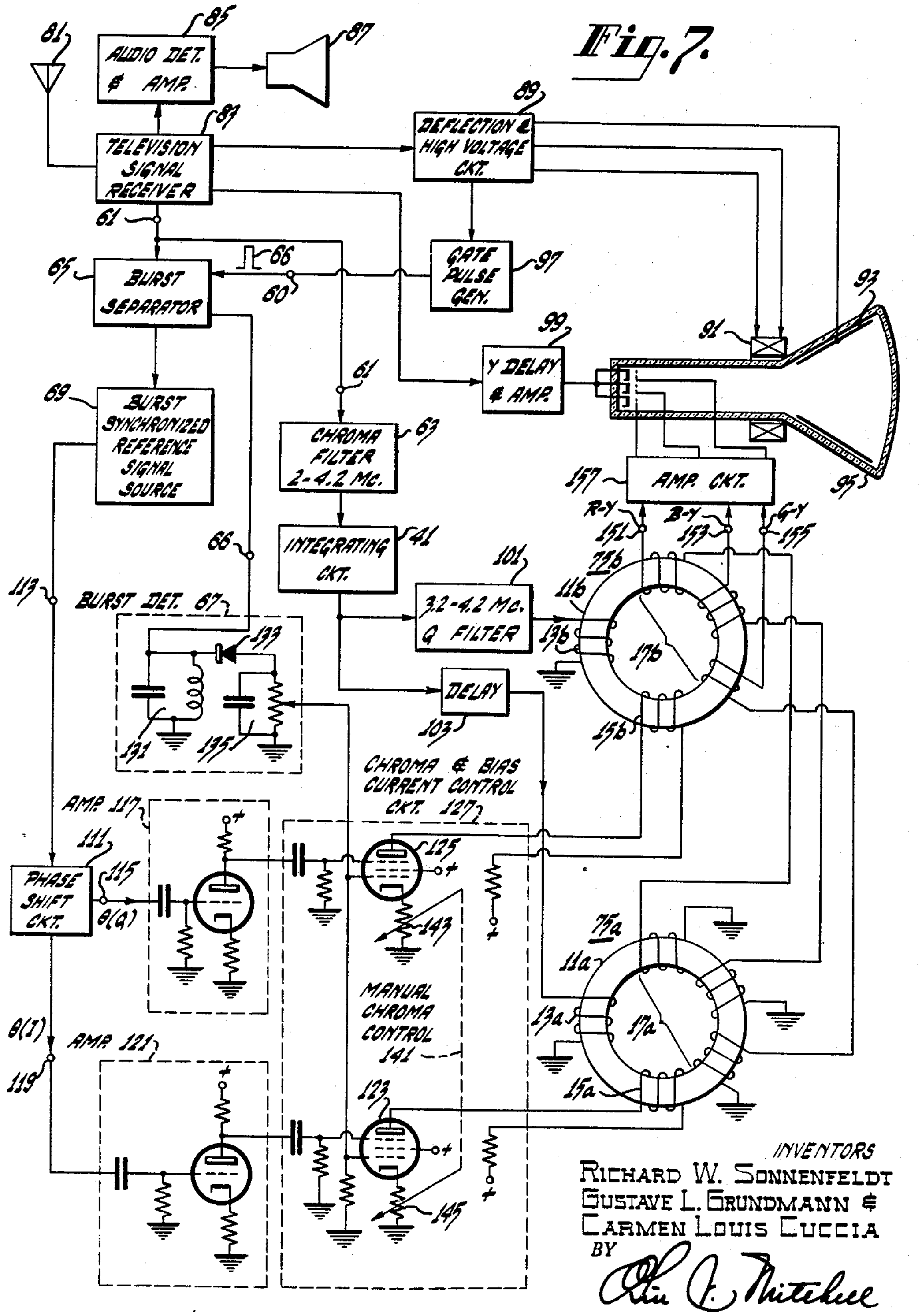
Figure 10:
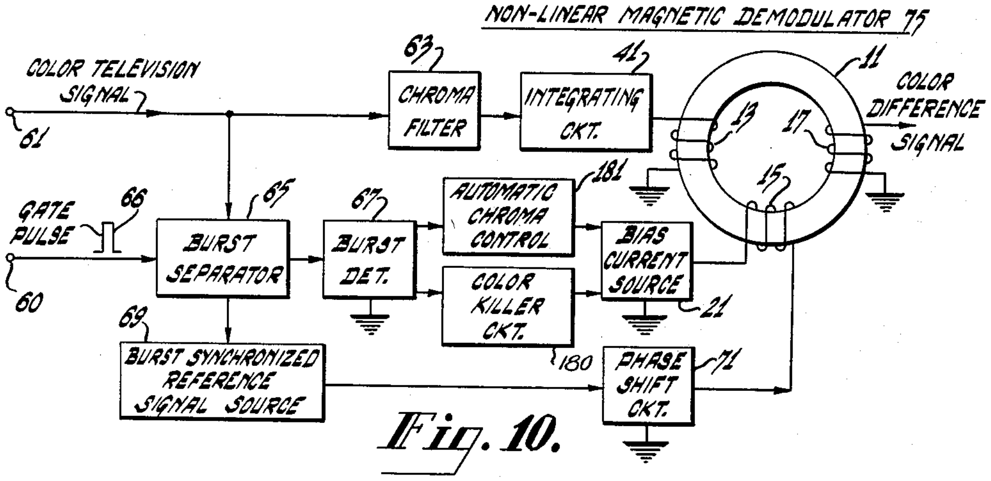
Figure 11:
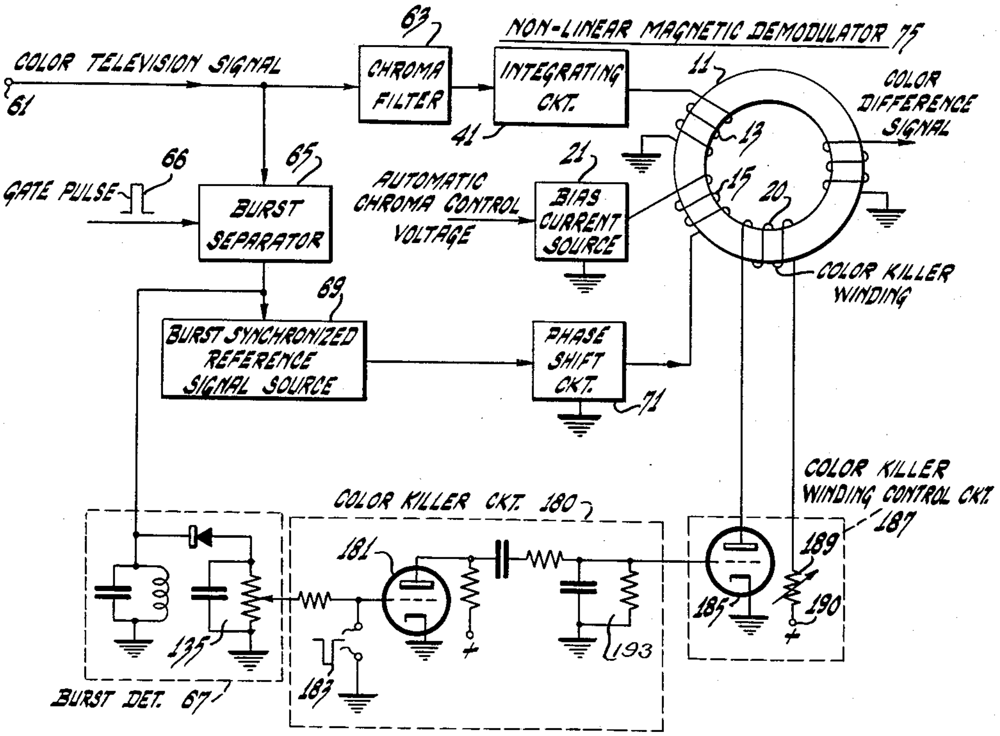

Other and incidental objects of this invention will be applied on the reading of the following specification and the study of the figures where:

Figure 1 is a vector diagram which relates the phases of color difference signal information to burst phase in a chrominance signal; and Figure 2 is a diagram of a non-linear magnetic demodulator circuit of the present invention; and Figure 3 is a diagram relating flux to ampere turns of the non-linear demodulator circuit of Figure 2; and Figures 4 and 5 are diagrams of non-linear magnetic demodulator circuits employing integrating circuits; and Figure 6 is a diagram of a chrominance channel using a non-linear magnetic demodulator and an automatic chroma control circuit of the present invention; and Figure 7 is a diagram of a color television receiver using the present invention; and Figures 8 and 9 are diagrams of demodulator and automatic chroma control circuits of the present invention; and Figures 10 and 11 are diagrams of color killer circuits of the invention.

*The color television signal*

Color difference signal information may be processed from a chrominance signal using different types and arrangements of circuits of the present invention. Consider first, therefore, the nature of the chrominance signal so that the operation of the circuits of the invention to be described in the specification will be more fully understood.

The chrominance signal is a modulated subcarrier having modulations representative of different color difference signal information in each phase. As is shown in Figure 1, color difference signal information relating to $R-Y$, $B-Y$, and $G-Y$ color difference signals occur at phases lagging the burst phase by 90°, 180°, and 304.26° respectively. Each of the three latter-named color difference signals may be demodulated from the chrominance signal at the phases indicated; any one of the three color difference signals may alternatively be formed by combining prescribed amplitudes of negative-polarity versions of the two color difference signals.

The chrominance signal also includes the so-called I and Q color difference signals which describe color signal information along the orange-cyan axis and the green-purple axis respectively in the chromaticity diagram; the I signal, which is a wide band signal containing modulation components up to 1½ mc., has a phase which lags the burst phase by 57°. The Q signal, which is a relatively narrow band color difference signal including modulating components having frequencies up to 0.5 mc. has a phase which lags the I signal phase by 90°. The I and Q signals may be combined using different amplitudes and polarities of these signals to form wide band $R-Y$, $B-Y$, and $G-Y$ color difference signals, according to the proportions:

$$R-Y=.96I+.62Q$$

$$B-Y=-1.1I+1.7Q$$

$$G-Y=-.28I-.64Q$$

*Non-linear magnetic demodulators*

Figure 2 is one form of non-linear magnetic demodulator, used in the present invention, which includes a high-$\mu$ iron core 11 which has a trio of windings; these windings include an input winding 13, a demodulating signal winding 15, and an output winding 17.

The flux $\phi$ through the iron core 11 is related to the current through one or more of the windings according to the characteristic curve shown in Figure 3; the characteristic curve of Figure 3 is a hysteresis curve which shows the flux $\phi$ through the iron core 11 to be a non-linear function of the ampere turns NI.

When the current I represents different signals comprising the color subcarrier information and a demodulating signal, respectively, these signals will be mixed because of the non-linear relationship between NI and $\phi$ thereby causing the flux $\phi$ to have a component representative of demodulated color subcarrier information.

The flux $\phi$ will pass through the output winding; the voltage induced in this output winding by the flux will be equal to the time derivative of the flux $\phi$ and therefore will represent the time derivative of demodulated color subcarrier information.

If the color subcarrier information applied to the input winding 13 represents an integrated chrominance signal, then the differentiated demodulated color subcarrier information provided by the output winding 17, will be a color difference signal which occurs in the chrominance signal at a phase related to the phase of the demodulating signal. If a chrominance signal is applied to the input winding 13, then the signal delivered by the output winding 17 will be a differentiated color difference signal corresponding to color difference signal information in the chrominance signal at a phase related to the phase of the demodulated signal.

*The operation of an amplitude controlled nonlinear magnetic demodulator*

A nonlinear magnetic demodulator whose output demodulated signal is controllable in amplitude, operates as follows:

The output voltage $e_o$ developed at the output winding 17 is related to the flux $\phi$ by the expression $$e_o=N_o\frac{d\phi}{dt}$$

where $N_o$ is the number of turns in the output winding. The flux $\phi$ is related to the ampere turns of the iron core 11 according to the hysteresis curve shown in Figure 3 where I is the total current through the windings on the iron core 11. The ampere turns which produce the flux in the iron core 11 are a function of both the total turns included in the input winding 13 and the demodulating signal winding 15 (these windings remaining fixed), and the combined currents through these windings 13 and 15.

The flux $\phi$ may be shown to be representable by an infinite series which has a first order term, square law term, cubic term, and so on, which describe the interaction between currents relating to both information of the color subcarrier type and also to a demodulating signal. The operation of the nonlinear magnetic demodulator has been found to be operative according to the following:

A. When the demodulating signal is impressed into the demodulating signal winding such that the quiescent point of the signal is at $NI=0$, then the symmetry of the hysteresis diagram causes the even-order terms representing flux as a function of total ampere turns to vanish. For this condition, a demodulating signal having the same frequency as the color subcarrier information will produce no demodulated signal output voltage. On the other hand, a demodulating signal having half the frequency of the color subcarrier will produce a demodulated signal output voltage as a result of the third order term or cubic term of the aforementioned relationship. In like fashion, the present invention has been operated to show that when a demodulating signal has a frequency which is one-fourth of the color subcarrier frequency, the fifth power term in the aforementioned relationship will provide the demodulated signal information.

B. When a bias current is applied through one or more of the windings on an iron core so that the demodulating signal is biased about an average number of ampere turns, the operation of the non-linear magnetic demodulation in a non-symmetrical portion in a hysteresis diagram will cause all terms in the relationship of the flux and ampere turns to be non-zero; therefore, a demodulating signal having the frequency of the subcarrier will produce a demodulating signal output as a result of the square law term of the relationship. A demodulating signal having a one-half frequency of the color subcarrier frequency will produce a demodulating signal output as a result of the third term of the above relationship, and so on.

It is to be noted from Figure 3 that the biasing of, say, the demodulating signal to various average or quiescent values of ampere turns will produce operation in minor hysteresis loops such as the minor hysteresis loop 31 corresponding to the demodulating signal (ampere-turns variation) 35 superimposed upon the average ampere turns $NI_1$. The minor hysteresis loop 31 has a different form and different slope than the minor hysteresis loop 36 which is produced by the demodulating signal 38 oscillating about $NI_2$. Since the slope of each of the minor hysteresis loops 31 and 36, and of others which will correspond to other average values of NI, are of different slopes, then adjustment of the average ampere turns to different values will change the amplitude level of the output signal $e_0$ to be produced in the output winding 17.

It is to be noted that for signals superimposed on the average ampere turns $NI_3$, the change in flux will be negligible as a result of a change in ampere turns where the change is of small amplitude relative to the value of $NI_3$; for this type of operation, substantially no output voltage will be realized. The latter mode of operation is useful for color killer action, as is also the mode of operation whereby a demodulating signal, having the frequency of color subcarrier, has its quiescent point varied from $NI=0$ to a point where maximum non-symmetry of the hysteresis diagram curve occurs.

Accordingly, the present invention provides that control of the average ampere turns of a non-linear magnetic demodulator in accordance with, say, the signal strength of a received color synchronizing burst or a chrominance signal, will yield automatic gain control or automatic chroma control of demodulated signal information.

*Non-linear magnetic demodulator circuits*

Figures 4 and 5 are non-linear magnetic demodulator circuits having output signal amplitude control and which employ integrating circuits so that optimum fidelity of the demodulator will be realized.

In the circuit of Figure 4, the chrominance signal or chroma is applied to the integrating circuit 41. The form of integrating circuit 41 shown in Figure 4 consists of a resonant circuit 43 which is tuned to resonate at the subcarrier frequency of the chrominance signal, thereby accentuating the amplitude of signal components of the chrominance signal in the vicinity of the color subcarrier frequency and deaccentuating the amplitude of those chrominance signal components which are widely separated in frequency from the color subcarrier frequency. The output of the integrating circuit is an integrated chrominance signal which is applied by way of the line 45 to the input winding 13 of the high-$\mu$ iron core 11. A demodulating signal having a phase related to the phase $\theta_1$ of the chrominance signal is applied to the demodulating signal winding 15; the color difference signal corresponding to the phase $\theta_1$ in the chrominance signal is developed at the output winding 17.

The amplitude of the demodulated color difference signal is controlled by the bias controlled voltage which is applied to the bias current source 21, to control the average current through the demodulating signal winding 15 and therefore the average ampere turns of the non-linear magnetic demodulator.

The non-linear magnetic demodulator circuit of Figure 5 includes an integrating circuit 47 which is coupled to the output winding 17. The chrominance signal is applied to the input winding 13; a demodulating signal having the phase $\theta_1$ of the chrominance signal is applied to the demodulating signal winding 15. For reasons discussed earlier in the specification, a differentiated color difference signal corresponding to color difference signal information at the phase $\theta_1$ of the chrominance signal is developed across the output winding 17.

The integrating circuit 47, in this case consisting of a series connected resistor 51 and a shunt connected capacitor 53, integrates the differentiated color difference signal and thereupon provides the desired color difference signal at the output terminal 55. The bias current source 21 responsive to a bias control voltage controls the current through the demodulating signal winding of the high-$\mu$ iron core 11 thereby controlling the amplitude of the color difference signal developed in the output terminal 55.

The circuits used to illustrate forms of the integrating circuit 41 and integrating circuit 47 are simple and preferred circuits. However, it is to be appreciated that one skilled in the art can devise other types of integrating circuits which could be successfully used to perform the functions required of the integrating circuits 41 and 47.

*Amplitude controlled non-linear magnetic demodulator circuits in color television receivers*

Figure 6 is a diagram of a chrominance channel which uses the present invention to cause a demodulated color difference signal to have an amplitude level which is independent of fluctuations in signal strength of a received chrominance signal.

A color television signal is applied by way of terminal 61 to the chroma filter 63 and the burst separator 65. A gate pulse 66 which is timed to be in coincidence with color synchronizing bursts when present and which has a duration interval substantially equal to that of the color synchronizing bursts is applied to the burst separator 65. The output of the burst separator 65 consists of separated bursts which are applied to both the burst detector 67 and a burst synchronized reference signal source 69.

The burst detector 67 is a detector circuit, which peak-detects the separated bursts and develops a voltage which is indicative of the amplitude of the separated bursts. The control voltage provided by the burst detector 67 is applied to the bias current source 21.

The burst synchronized reference signal source is an oscillator or ringing circuit type of reference signal generator which develops a phase synchronized reference signal responsive to the separated bursts; the phase synchronized reference signal has a phase which is accurately synchronized by the separated bursts.

The reference signal is applied to the phase shift circuit 71 to produce a demodulating signal having a phase related to the phase $\theta_1$ of the chrominance signal. If the non-linear magnetic demodulator is to be operated so that the demodulating signal is a sub-harmonic or a harmonic of the color subcarrier frequency, then the *actual* phase of the demodulating signal will not coincide with a phase of the chrominance signal. This demodulating signal is thereupon passed through the demodulating signal winding 15 of the high-$\mu$ iron core 11 of the non-linear magnetic demodulator 75. The bias current source 21, in response to a burst height indicative control voltage developed by the burst detector 67, produces a bias current of controllable average level, which passes through the demodulating signal winding 15. The demodulating signal is superimposed upon this bias current.

The chrominance signal is separated from the color television signal from the chroma filter 63. The chroma filter 63 may have a bandwidth from 2 to 4.2 mc. if an I signal is to be demodulated, or a bandwidth from 3 to 4.2 mc. if a color difference signal other than an I signal is to be demodulated.

The output of the chroma filter 63 is a chrominance signal or chroma, which is integrated in the integrating circuit 41 and applied therefrom to the input winding 13 in the high-$\mu$ iron core 11. A color difference signal corresponding to color difference signal information at the phase $\theta_1$ in the chrominance signal is developed at the output winding 17. The amplitude of this color difference signal is caused to have an amplitude level which is independent of fluctuations of the amplitude of the color synchronizing bursts, responsive to the controlling of the bias current through the demodulating signal winding 15 by the burst detector 67.

Figure 7 is a diagram of a color television receiver which uses one form of automatic chroma control circuit of the present invention.

An incoming television signal from a broadcast transmitter is received at the antenna 81 and processed in the television signal receiver 83 where the demodulated color television signal is produced. The color television signal includes not only the luminance and chrominance signal but also the picture deflection synchronizing signals, the color synchronizing bursts and also an audio-modulated frequency-modulated carrier which is transmitted with a carrier frequency 4½ mc. removed from the frequency of the picture carrier of the incoming signal. In the case where monochrome image transmission is received by the antenna, the demodulated television signal will include only television information relating to the brightness or luminance information of the televised image, the picture deflection synchronizing signals, and the audio-modulated frequency modulated carrier.

The audio-modulated frequency modulated carrier is applied to the audio detector amplifier 85. Using, for example, an intercarrier sound circuit in the audio detector amplifier 85, the audio information is therein demodulated; the audio information is thereupon amplified and applied to the loud speaker 87.

The color television signal is applied to the deflection and high voltage circuit 89 which separates the picture deflection signals from the color television signal and develops therefrom vertical and horizontal deflection signals which are applied to the deflection yokes. A high voltage is also developed by the deflection and high voltage circuit 89; the high voltage is applied to the ultor 93 of the color kinescope 95. The deflection and high voltage circuit 89 also energizes the gate pulse generator 97 which develops the gate pulse 67; the gate pulse 66, as has been described in connection with Figure 6, has a time duration interval substantially equal to that of the color synchronizing bursts and occurs substantially in time coincidence with the bursts. The gate pulse generator 97 usually takes the form of a winding on a high voltage transformer of the deflection and high voltage circuit 89. However, the gate pulse generator 97 may alternatively take the form of a multivibrator which will operate responsive to triggering by each horizontal synchronizing pulse.

The color television signal, which constitutes principally luminance signal information when no portion of the color television signal is subjected to a synchronous demodulation process, is applied by way of the Y-delay and amplifier circuit 99 to the cathodes of the color kinescope 95.

The chrominance channel of the color television receiver of Figure 7 is operatively connected to furnish I and Q signals which are combined in proper proportions and polarities to form $R-Y$, $B-Y$, and $G-Y$ color difference signals. Circuits which perform the same functions as those circuits described in Figure 6 will be given the same or similar numerals.

The color television signal is applied to the chrominance filter 63 which separates the chrominance signal from the color television signal; the chrominance signal is integrated by the integrating circuit 41 with the integrated chrominance signal applied simultaneously to the Q filter 101 and to the delay line 103. The chrominance signal at the output of the integrating circuit 41 has a band width from 2 to 4.2 mc. This chrominance signal is applied through the delay line 103 and applied therefrom to the input winding **13*a* of the iron core 11*a* of the non-linear magnetic demodulator 75*a***.

The integrated chrominance signal is applied to the Q filter 101 which eliminates those chrominance signal components in the range from 2–3.2 mc. and applies a narrow band chrominance signal having a frequency range from 3.2 to 4.2 mc. to the input winding **13*b* of the iron core 11*b* of the non-linear magnetic demodulator 75*b***.

The color synchronizing bursts are separated from the color television signal in the burst separator 65 and are utilized to develop a phase synchronized reference signal in the burst synchronized reference signal source 69. The reference signal is applied from the burst synchronized reference signal source 69 to the phase shift circuit 111 by way of the terminal 113. The phase shift circuit 111 produces a pair of demodulating signals. One demodulated signal, termed the Q demodulating signal, $\theta(Q)$, is developed at the output terminal 115 and is amplified therefrom in the amplifier 117; the Q demodulating signal has a phase related to the phase of the Q signal in the chrominance signal. The phase shift circuit 111 also produces a demodulating signal at the output terminal 119; this demodulating signal, which is termed the I demodulating signal $\theta(I)$, has a phase related to the phase of the I signal in the Q signal. The I phase demodulating signal is amplified in the amplifier 121.

The amplified I demodulating signal and the Q demodulating signal are applied to control grids of the pentodes 123 and 125 respectively, of the chroma and bias control circuit 127. The anode of the pentode 125, to which the Q demodulating signal is applied, is coupled to a demodulating signal winding **15*b* in the iron core 11*b*. The anode of the pentode 123, to which the I demodulating signal is applied, is connected to the demodulating signal winding 15*a* of the iron core 11*a***.

The separated bursts from the burst separator 65 are applied to the resonant circuit 131 of the burst detector 67. A rectifier 133 which is serially connected to a resistance condenser network 135 with the resulting series circuit connected in shunt with the resonant circuit 131, detects the peak amplitude of the bursts; a control voltage derived from the resistance-condenser network 135 is used to provide grid bias and therefore gain control for both the pentodes 123 and 125 of the chroma and bias control circuit 127.

A manual chroma control 141 which controls the magnitudes of the cathode resistors 143 and 145 of the pentodes 123 and 125 provides manual control of the current through both of the latter named pentodes and therefore through the demodulating signal windings **15*a* and 15*b***.

The control voltage applied from the burst detector 67 to the control grids of the pentodes 123 and 125 varies the average current through the demodulating signal windings **15*a* and 15*b* with a prescribed relationship with respect to burst amplitude so as to adjust the operation to each of the iron cores 11*a* and 11*b* to points on the ampere turns vs. flux diagrams associated with the circuits of these iron cores so that the amplitude level of demodulated signal information developed in the flux of each of the iron cores 11*a* and 11*b*** *will be independent of fluctuations* in burst height or amplitude.

The iron cores **11*a* and 11*b* of the non-linear magnetic demodulators 75*a* and 75*b*, respectively, each have a trio of output windings; each of these iron cores 11*a* and 11*b* in association with their input, output, and demodulating signal windings form the non-linear magnetic demodulators 75*a* and 75*b***.

I signal information in different proportions and different polarities will be developed in each of the trio of output windings **17*a* of the iron core 11*a***. Q signal information in different proportions and different polarities will be developed in each of the trio of output windings 17*b* on the iron core 11*b*. Corresponding ones of each of the trios of output windings 17*a* and 17*b* are connected in series to provide combinations of I and Q signal information according to the proportions and polarities mentioned earlier in the specification, $R-Y$, $B-Y$, and $G-Y$ color difference signals are thereupon developed at the output terminals 151, 153, and 155, respectively.

The $R-Y$, $B-Y$, and $G-Y$ color difference signals are amplified in the amplifier circuit 157 and applied therefrom to control grids of the electron guns of the color kinescope 95. Each of the color difference signals applied to the control grids of the color kinescope 95 is combined with the luminance signal to form each of the component color signals in the electron beam which impinges on the target area which produces the color light related to that component color signal.

Although the circuit of Figure 7 shows the luminance and color difference signals being added or combined within the color kinescope 95, it is to be appreciated that the combination of the luminance signal with each of the color difference signals could alternatively be performed in circuits external to the color kinescope with the resulting component color kinescope thereupon utilized to control the light output from the color kinescope.

Figures 8 and 9 are diagrams of other forms of chrominance channels which demodulate color difference signal information using automatic chroma control circuits of the present invention.

In the circuit of Figure 8 the phase shift circuit 111 is adapted to provide $R-Y$ and $B-Y$ demodulating signals at the output terminals 115. The $R-Y$ and $B-Y$ demodulating signals, denoted in the diagram as $\theta\ (R-Y)$ and $\theta\ (B-Y)$, respectively, are amplified at the amplifiers 117 and 121. The burst detector 67 and the chroma and bias current control circuit 127, function in a manner similar to that described in connection with the corresponding circuits of Figure 7, to energize the demodulating signal windings 15*a* and 15*b* with burst-responsive amplitude, level-controlled demodulating signal currents.

The color television signal is applied to the chroma filter 63*a* which has a pass band from 3 to 4.2 mc. A narrow band chrominance signal is provided by the chroma filter 63*a*; this chrominance signal is thereupon integrated in the integrating circuit 41 and applied to both the input winding 13*a* and 13*b* of the iron cores 11*a* and 11*b*.

The iron cores 11*a* and 11*b* have output windings 17′ and 17″, each of which has a tap to ground on an intermediate turn. The iron core 11*b* and its associated windings will produce a $R-Y$ color difference signal in its output winding 17″ responsive to the $R-Y$ demodulating signal. The iron core 11*a* and its associated windings will produce a $B-Y$ color difference signal in the output winding 17′ responsive to the $B-Y$ demodulating signal.

The output windings 17′ and 17″, having a tap to ground on an intermediate turn, produce both polarities of the demodulated signal produced there. For example, an $R-Y$ color difference signal is produced at the output terminal 151 of the output winding 17″. A $-(R-Y)$ color difference signal is produced at the output terminal 161 at the other end of the output winding 17″. In like fashion the output winding 17′ will produce a $B-Y$ color difference signal at the output terminal 153 and will also produce a $-(B-Y)$ color difference signal at the output terminal 163 at the other end of the winding 17′. The $-(R-Y)$ and the $-(B-Y)$ color difference signals are applied through amplitude-correcting resistors 165 and 167 to the output terminal 155 to produce a $G-Y$ color difference signal at that output terminal.

Figure 9 is a circuit diagram of a chrominance channel for demodulating color difference signal information, which utilizes a trio of non-linear magnetic demodulators, 75*a*, 75*b*, and 75*c*.

The phase shift circuit 111, responsive to the reference signal provided by way of terminal 113 develops an $R-Y$ demodulating signal of the output terminal 115, a $B-Y$ demodulating signal at the output terminal 117 and a $G-Y$ at the demodulating signal at the output terminal 171. The $G-Y$ phase demodulating signal is denoted as $\theta\ (G-Y)$.

The $R-Y$, $B-Y$, and $G-Y$ phase demodulating signals are amplified in the amplifiers 117, 121, and 173, respectively, and applied therefrom to the third grids of the pentodes 125, 123, and 175, respectively, of the chroma and bias current control circuit 127. Each of the pentodes 125, 123, and 175 of the chroma and bias current control circuit 127 are gain controlled by the control voltage furnished from the resistance-condenser network 135 of the burst detector 67. Each of the pentodes 125, 123, and 175, provides an amplitude controlled current upon which a corresponding demodulating signal variation is superimposed to the demodulating signal windings 15*c*, 15*b*, and 15*a*, respectively.

The integrated chrominance signal is applied from the integrating circuit 41 to the input windings 13*c*, 13*b*, and 13*a* of the non-linear magnetic demodulators 75*c*, 75*b*, and 75*a*, respectively. The output windings 17‴, 17″, and 17′ develop $R-Y$, $B-Y$ and $G-Y$ color difference signals, respectively, at the corresponding output terminals 151, 153, and 155.

In each of the circuits shown in Figures 2 and 4 through 9, the chroma amplitude controlling bias current is provided through the demodulating signal windings of an iron core 11. It is to be appreciated by one skilled in the art that a chroma-amplitude-controlling current which performs the functions of the present invention can also be applied through either the input winding or the output winding, or through another winding included on a high-$\mu$ iron core 11.

*Color killers of the invention*

As has been pointed out earlier in the specification, it is often desirable that a color killer type of circuit be installed in a color television receiver; the color killer circuit prevents information from being developed in the chrominance signal demodulating circuits during a transmission wherein no color synchronizing bursts or no chrominance signal information is included.

Figure 10 shows a diagram of one form of color killer and automatic chroma control type of circuit which is used to control the operation of the non-linear magnetic demodulator 75.

In the previously discussed automatic chroma control circuits, the burst detector 67 furnished an automatic chroma control voltage directly to the bias current source 21 so that the color difference signal developed by the non-linear magnetic demodulator 75 had a voltage variation bearing a prescribed relationship to the signal strength of the color synchronizing burst in the color television signal. The automatic chroma control circuit shown in the box denoted as 181, performs this function of providing an automatic chroma control voltage to the bias current source 21. In addition, a color killer circuit 180, which is also controlled by the burst detector 67 develops a signal when the color synchronizing bursts are absent which causes the bias current source 21 to provide a current through the demodulating signal winding 15 which prevents any color difference signal information from being developed in the output winding 17; during this type of operation the bias current source 21 will saturate the high-$\mu$ iron core 11.

Figure 11 is a circuit showing in detail how a color killer circuit may be used in conjunction with an auxiliary or fourth winding 20 on the high-$\mu$ iron core 11 of a nonlinear magnetic demodulator 75. Circuits performing the same function as those circuits already described in connection with Figure 6 are assigned the same numerals.

In the color killer circuit of Figure 11, the gate pulse 67 and the television signal are applied to the burst separator 65; during color transmission, separated bursts are applied simultaneously therefrom to the burst synchronized reference signal source 69 and to the burst detector 67. The resistance condenser network 135 of the burst detector 67 is coupled to the control grid of the tube 181 of the color killer circuit 180. A negative pulse 183 occurring during each retrace interval is also applied to the control grid of tube 181.

When the color synchronizing bursts are present, the burst detector 67 develops a negative bias at the control grid of tube 181 which cuts tube 181 off to such an extent that the pulse 183 does not cause conduction through tube 181.

Tube 181 is coupled to control the current through the tube 185 of the color killer winding control circuit 187. The tube 185 has an anode which is coupled through the color killer winding and the anode load 189 to a source of potential 190. The control grid of tube 185 is coupled to a resistance-condenser circuit 193 having a long time constant; the resistance-condenser circuit 193 is coupled to the anode of the tube 181 of the color killer circuit 180. The resistance-condenser circuit 193 has a time constant which is substantially longer than the time of each scanning interval of the television picture.

Since the tube 181 is biased far into the cut-off region, the pulse 183 does not develop a voltage across the resistance-condenser network 193, no current flows through tube 181, and no saturating current is produced by the tube 185 in the high-$\mu$ iron core 11. The nonlinear magnetic demodulator is therefore operative.

When the color synchronizing bursts are absent in the television signal in the time intervals during which they would normally occur during color transmission, the burst detector 67 will *not* develop a negative bias at the control grid of tube 181. Tube 181 is therefore capable of conduction and the gate pulse 183 applied to the control grid of tube 181 develops a positive voltage of large magnitude across the resistance-condenser circuit 193. The tube 185, responsive to the voltage developed across the resistance-condenser circuit 193, therefore develops a sufficient amount of current through the color killer winding 20 to saturate the high-$\mu$ iron core 11 and thereby prevent any signal information being provided by way of the chroma filter 63 and the integrating circuit 41 to the input winding 13.

Having described the invention, what is claimed is:

1. In combination: a magnetic device having a nonlinear relationship between ampere turns and flux and capable of developing demodulated signal information from ampere turns representative of both a modulated color subcarrier and a demodulating signal of prescribed phase applied to said magnetic device, said demodulated signal information having an amplitude level dependent upon a controllable average level of said ampere turns; means to apply ampere turns representative of both high frequency components of a television signal and of a demodulating signal of prescribed phase to said magnetic device, said high frequency components constituting a modulated color subcarrier during color television transmission, means to develop a control signal representative of the signal strength of signal information occurring in selected time intervals of said television signal, and means coupled to said magnetic device and to said control signal developing means and responsive to said control signal to control the average level of ampere turns of said magnetic device in accordance with said control signal.

2. In a color television receiver adapted to receive a chrominance signal and also color synchronizing bursts, said chrominance signal including a plurality of color difference signals each capable of being synchronously detected by a demodulating signal at a prescribed phase of said chrominance signal, said color synchronizing bursts having a prescribed phase relative to the phase of said chrominance signal and having an amplitude which is indicative of the signal strength of said chrominance signal, an automatic gain control circuit comprising in combination: means to derive from said color synchronizing bursts a control signal representative of the signal strength of said chrominance signal, an iron core having a plurality of windings, means to derive from said color synchronizing bursts a demodulating signal having a prescribed phase of said chrominance signal at which occurs information relating to a prescribed color difference signal, means to apply said chrominance signal and said demodulating signal to selected windings of said iron core whereby said prescribed color difference signal is developed across one of said windings, means coupled to said control signal developing circuit and to one of said windings and responsive to said control signal to control the average current through that winding in accordance with a prescribed relationship with respect to said signal strength of said chrominance signal.

3. In a color television receiver adapted to receive a color television signal including a color information subcarrier, said color information subcarrier including a plurality of color information signals each occurring at a prescribed phase of said color information subcarrier, said color television signal also including color synchronizing bursts having a reference phase related to the phases of said color information signal in said color information subcarrier and having an amplitude indicative of the signal strength of said color information subcarrier, the combination of: a nonlinear magnetic device capable of producing flux which is controllable by applied signals, means responsive to said bursts to both vary the flux of said nonlinear inductance at a phase related to a predetermined phase of said color information subcarrier and to control the average flux level of said nonlinear magnetic device as a function of the signal strength of said color information subcarrier, means to apply said color information subcarrier to said nonlinear magnetic device to produce variation of said flux corresponding to said color information subcarrier, and means to derive from the total variation of said flux in said nonlinear magnetic device color difference information corresponding to the color information occurring in the color information subcarrier at said predetermined phase.

4. In a color television receiver adapted to receive a chrominance signal and also color synchronizing bursts, said chrominance signal including a plurality of color difference signals each capable of being synchronously detected by a demodulating signal at a prescribed phase of said chrominance signal, said color synchronizing bursts having a prescribed phase relative to the phase of said chrominance signal and having an amplitude which is indicative of the signal strength of said chrominance signal, an automatic gain control circuit comprising in combination: a high-$\mu$ iron core having a plurality of windings, means to apply said chrominance signal to a first of said plurality of windings, means to derive from said color synchronizing bursts a demodulating signal having a prescribed phase of said chrominance signal at which information relating to a predetermined color difference signal occurs, means coupled to said demodulating signal developing means to apply said demodulating signal to a second of said plurality of windings whereby information relating to said predetermined color difference signal is developed in a third of said plurality of windings, means to derive from said color synchronizing bursts a control signal which has an amplitude representative of the signal strength of said chrominance signal, means included in said demodulating signal applying means and coupled to said control signal developing circuit to control the amplitude level of said color difference signal information developed in said third of said output windings according to a prescribed relationship with respect to the signal strength of said chrominance signal.

5. In combination: a circuit to provide information relating to a color subcarrier, said color subcarrier including modulations representative of different color difference signals at different phases, means to develop a signal having a phase related to a prescribed phase of said color subcarrier wherein modulations representative of a prescribed color difference signal occur, an iron core having a plurality of windings and capable of having flux produced by ampere turns resulting from signal currents produced in said plurality of windings, means coupled to said information providing circuit and to a first of said plurality of windings to apply said color subcarrier to said first of said plurality of windings, means to apply said demodulating signal to a second of said plurality of windings to produce a variation of ampere turns and flux in said iron core to cause a differentiated version of said prescribed color difference signal to be developed in a third of said plurality of windings, said demodulating signal applying means including means to control the average ampere turns of said iron core, means coupled to said information providing circuit to develop a signal indicative of the signal strength of said color subcarrier and means to couple said control signal to said ampere turns controlling circuit to control the amplitude level of said demodulated information, and an integrating circuit means coupled to a third of said plurality of windings to produce said prescribed color difference signal from said differentiated version.

6. In combination: a circuit to provide an information signal relating to a color subcarrier, said color subcarrier including modulations representative of different color difference signals at different phases, means to integrate said information signal relating to said subcarrier, means to develop a signal having a phase related to a prescribed phase of said color subcarrier wherein modulations representative of a prescribed color difference signal occur, an iron core having a plurality of windings and capable of having ampere turns produced by current through said windings, means coupled to said integrating circuit and to a first of said plurality of windings to apply said integrated information signal thereto, means to apply said demodulating signal to a second of said plurality of windings to produce a variation of ampere turns on said iron core to cause information related to said desired color difference signal to be developed in a third of said plurality of windings, said demodulating signal applying means including means to control the average ampere turns of said iron core, means coupled to said information providing circuit to develop a control signal indicative of the signal strength of said information, and means to couple said control signal to said ampere turns controlling circuit to control the amplitude level of said demodulated information.

7. In a color television receiver adapted to receive a color television signal including a chrominance signal and color synchronizing bursts, said chrominance signal including modulations representative of a pair of color difference signals occurring at a first and second phase of said chrominance signal, an opposite polarity of each of said pair of color difference signals capable of being combined in prescribed amplitudes to produce a third color difference signal, said color synchronizing bursts having a frequency of said chrominance signal and having a reference phase relative to said first and second phases of said chrominance signal and having an amplitude related to the signal strength of said chrominance signal, an automatic gain-controlled color demodulator comprising in combination: a first and second iron core each having an input winding, a demodulating signal winding, and an output winding, each of said output windings operatively connected to produce both a standard and an opposite polarity of demodulated signal information, means to integrate said chrominance signal, means coupled to said integrating chrominance signal to the input windings of each of said first and second iron cores, means to derive from said color synchronizing bursts a first and second demodulating signal having phases related to said first and second phase of said chrominance signal, respectively, means to apply said first and second demodulating signals to the demodulating signal windings of said first and second iron cores, respectively, to thereby develop said pair of color difference signals in said output windings of said first and second iron cores, means to couple said output windings of said first and second iron cores to combine opposite polarities of said pair of color difference signals to form said third color difference signal, means to develop to a control signal indicative of the amplitude level of said color synchronizing bursts, and means coupled to said control signal developing means and to a selected one of said windings of each of said first and second iron cores to control the average current through said selected windings in accordance with said control signal.

8. In a color television receiver adapted to receive a color television signal including a chrominance signal and color synchronizing bursts, said chrominance signal including modulations representative of a plurality of color difference signals occurring at different phases of said chrominance signal, each of said plurality of color difference signals capable of being combined in prescribed amplitudes and polarities to produce other color difference signals, said color synchronizing bursts having a frequency of said chrominance signal and having a phase relative to said first and second phases of said chrominance signal and also having an amplitude related to the signal strength of said chrominance signal, a gain-controlled color demodulator comprising in combination: a group of iron cores each having an input winding, a demodulating signal winding, and at least one output winding, means to apply signal information related to said chrominance signal to the input windings of each of said group of iron cores, means to derive from said color synchronizing bursts different demodulating signals having phases corresponding to the phases at which said plurality of color difference signals occur in said chrominance signal, means to apply demodulating signals to selected demodulating signal winding of said group of iron cores to develop said plurality of color difference signals in the output windings of said group of iron cores, means to develop a control signal from said color synchronizing bursts which is indicative of the amplitude level of said color synchronizing bursts, and means coupled to said control signal developing means and to at least one of said windings of each of said group of iron cores to control the average current through each of said windings to which said control signal developing means is coupled responsive to said control signal.

9. In a color television receiver adapted to receive a color television signal including a chrominance signal and color synchronizing bursts, said chrominance signal including modulations representative of a pair of color difference signals occurring at a first and second phase of said chrominance signal, each of said pair of color difference signals capable of being combined in prescribed amplitudes and polarities to produce other color difference signals, said color synchronizing bursts having a frequency of said chrominance signal and having a phase relative to said first and second phases of said chrominance signal and also having an amplitude related to the signal strength of said chrominance signal, a gain-controlled color demodulator comprising in combination: a first and second iron core each having an input winding, a demodulating signal winding, and a plurality of output windings, means to apply signal information related to said chrominance signal to the input windings of each of said first and second iron cores, means to derive from said color synchronizing bursts a first and second demodulating signal having phases corresponding to said first and second phases, respectively, of said chrominance signal, means to apply said first and second demodulating signals to the demodulating signal windings of said first and second iron cores, respectively, means to couple selected output windings of both said first and second iron cores to develop a prescribed group of color difference signals, means to develop a control signal from said color synchronizing bursts which is indicative of the amplitude level of said color synchronizing bursts, and means coupled to said control signal developing means and to at least one of said windings of each of said first and second iron cores to control the average current through each of said windings to which said control signal developing means is coupled in accordance with said control signal.

10. In combination: a magnetic device having a nonlinear relationship between ampere turns and flux and capable of developing demodulated signal information from ampere turns representative of both a modulated color subcarrier and a demodulating signal of prescribed phase applied to said magnetic device, said demodulated signal information having an amplitude level dependent upon a controllable average level of said ampere turns; means to apply ampere turns representative of both high frequency components of a television signal and of a demodulating signal of prescribed phase to said magnetic device, said high frequency components constituting a modulated color subcarrier during color television transmission, means to develop a control signal responsive to signal information capable of occurring in selected time intervals of said television signal and indicative of either the presence or absence of a modulated color subcarrier in a received television signal, and means coupled to said magnetic device and to said control signal developing means and responsive to said control signal to disable said magnetic device when said color subcarrier is absent in said received television signal.

11. In a color television receiver adapted to receive a television signal which includes a chrominance signal and a high frequency range and also color synchronizing bursts only during color transmission, said color synchronizing bursts having a reference phase relative to the phases of said chrominance signal, the combination of: a synchronous demodulator employing a saturable magnetic device capable of producing flux which is controllable by applied signals and of being saturated by ampere turns of prescribed magnitude, means to apply a prescribed frequency range of said television signal and also a sinusoidal signal capable of being phase synchronized by said bursts during color transmission to said nonlinear magnetic device to vary the flux in said nonlinear magnetic device in accordance with said television signal and said sinusoidal signal, means to derive from said television signal a control signal having a first magnitude when said bursts are present in said television signal and having a second magnitude when said bursts are absent in said television signal, and means coupled to said control signal deriving circuit and to said saturable magnetic device to produce ampere turns therein to provide saturation of said saturable magnetic device when said bursts are absent in said television signal to thereby disable said synchronous demodulator.

12. In combination: a source of a modulated color subcarrier having each of a plurality of color information signals to be modulated at different phases of said color subcarrier, an iron core having a plurality of windings, said iron core providing controllable transmission between a first and second of said plurality of windings according to the magnitude of current passed through a third of said windings, means to apply said color subcarrier to a first of said plurality of windings, means to apply a demodulating signal having a predetermined phase of said color subcarrier to a third of said plurality of windings, a source of intermittent signals having an amplitude which is indicative of the signal strength of said color subcarrier, means coupled to said intermittent signal source to develop a control signal indicative of the signal strength of said subcarrier, and means included in said demodulating signal applying means to pass an average value of current through said third of said windings which is varied in accordance with said control signal.

13. In combination: a source of a modulated color subcarrier having each of a plurality of color information signals to be modulated at different phases of said color subcarrier, a controllable reactance device having a plurality of reactance-control terminals, the reactance of said controllable reactance device being dependent upon a signal applied to any of said terminals, means to apply said color subcarrier to a second of said terminals, means to apply a demodulating signal having a predetermined phase of said color subcarrier to a third of said terminals, a source of intermittent signals having an amplitude which is indicative of the signal strength of said color subcarrier, means coupled to said intermittent signal source to develop a control signal indicative of the signal strength of said subcarrier, and means to apply said control signal to one of said terminals.

14. In a color television receiver adapted to receive a color television signal which includes a chrominance signal having a plurality of color information signals occurring at prescribed phases of said chrominance signal and also color synchronizing bursts having a reference phase related to the phases of said chrominance signal, said color synchronizing bursts having an amplitude which is related to the signal strength of said chrominance signal, the combination of: a plurality of nonlinear magnetic demodulators each including an iron core having an input winding, a demodulating signal winding, and at least one output winding, means to derive from said color synchronizing bursts a plurality of demodulating signals each having a phase corresponding to the phase of one of said color information signals in said chrominance signal, means to apply information relating to said chrominance signal to the input windings of each of said nonlinear magnetic demodulators, means to derive from said color synchronizing bursts a signal indicative of said color synchronizing bursts and therefore of the signal strength of said chrominance signal, a plurality of amplifiers having input and gain-control circuits and output circuits, means to couple each of the output circuits of said amplifiers to the input windings of selected ones of said plurality of nonlinear magnetic demodulators, and means to apply said control signal and one of said demodulating signals to the input circuit and gain-control circuit of a corresponding one of each of said amplifiers to cause each amplifier to produce current in the demodulating signal winding to which it is coupled, said current having a variation in accordance with the applied demodulating signal and having an average level which varies in accordance with said control signal.

15. In combination: a nonlinear reactance means having a reactance controllable according to the magnitude of an applied control voltage for developing demodulated signal information responsive to the application of both a modulated color subcarrier and a demodulating signal of prescribed phase to said nonlinear reactance means to thereby vary the reactance of said nonlinear reactance means accordingly, said demodulated signal information having an amplitude level dependent upon the magnitude of said control voltage; means to apply both a modulated color subcarrier and a demodulating signal of prescribed phase to said nonlinear reactance means, a means to develop a control voltage indicative of the signal strength of said modulated color subcarrier, means to apply said control voltage to said nonlinear reactance means to control the amplitude level of said demodulated signal information in accordance with the signal strength of said modulated color subcarrier and a utilization means to which said developed demodulated signal information is applied.

16. In a color television receiver adapted to receive a television signal which includes a chrominance signal and color synchronizing bursts only during color transmission, said chrominance signal occurring in a higher frequency range of said television signal when present and including a plurality of color difference signal information occurring at different phases relative to a reference phase, said color synchronizing bursts conveying reference phase information and having an amplitude level which yields an indication of the signal of the signal strength of said chrominance signal during color transmission, the combination of: a nonlinear reactance means having a reactance controllable according to the magnitude of an applied voltage and capable of developing demodulated signal information as a result of a chrominance signal and a demodulating signal of prescribed phase applied to said nonlinear reactance means, said demodulated signal information having an amplitude level dependent upon the magnitude of said control voltage, means to derive a demodulating signal of a selected phase from said color synchronizing bursts during color transmission, means to derive from said television signal a control signal having a first magnitude when said bursts are present and a second magnitude when said bursts are absent, means to apply both said higher frequency range of said television signal to said nonlinear reactance means, means coupling said demodulating signal deriving means to said nonlinear reactance means, and means to apply said control signal to said nonlinear reactance means whereby said nonlinear reactance means is disabled when said color synchronizing bursts are not present in said television signal and whereby said nonlinear reactance means develops a color difference signal corresponding to information occurring at said selected phase in said chrominance signal during color transmission.

17. In combination: a nonlinear reactance means having a reactance controllable according to the magnitude of an applied control voltage for developing demodulated signal information responsive to a modulated color subcarrier applied thereto and to a variation of reactance produced by a demodulating signal of prescribed phase applied to said nonlinear reactance means, said demodulated signal information having an amplitude level dependent upon the magnitude of said control voltage; means to apply both a modulated color subcarrier and a demodulating signal of prescribed phase to said nonlinear reactance means, a means to develop a control voltage responsive to the signal strength of said modulated color subcarrier, means to apply said control voltage to said nonlinear reactance means to control the amplitude level of said demodulated signal information in accordance with the signal strength of said modulated color subcarrier and a utilization means to which said developed demodulated signal information is applied.

References Cited in the file of this patent

UNITED STATES PATENTS

| | | |
|---|---|---|
| 2,265,296 | Lee | Dec. 9, 1941 |
| 2,686,290 | Macklem | Aug. 10, 1954 |

OTHER REFERENCES

Design Techniques, Electronics, February 1954, pages 136–143. (Copy in Division 41.)